United States Patent [19]

Ohlendorf et al.

[11] Patent Number: 4,903,650
[45] Date of Patent: Feb. 27, 1990

[54] APPARATUS FOR RELATIVE ANGULAR ADJUSTMENT BETWEEN TWO SHAFTS IN DRIVE CONNECTION

[75] Inventors: Rolf Ohlendorf, Weinstadt; Willy Treyz, Neckartailfingen; Gerhard Doll, Pleidelsheim; Wolfgang Speier, Tübingen, all of Fed. Rep. of Germany

[73] Assignee: Daimler-Benz AG, Stuttgart, Fed. Rep. of Germany

[21] Appl. No.: 378,965

[22] Filed: Jul. 12, 1989

[30] Foreign Application Priority Data

Jul. 23, 1988 [DE] Fed. Rep. of Germany ....... 3825074

[51] Int. Cl.⁴ ................................................ F01L 1/34
[52] U.S. Cl. ................................. 123/90.17; 123/90.31
[58] Field of Search ............... 123/90.12, 90.13, 90.15, 123/90.17, 90.31

[56] References Cited

U.S. PATENT DOCUMENTS

| | | | |
|---|---|---|---|
| 3,978,829 | 9/1976 | Takahashi et al. | 123/90.17 |
| 4,498,431 | 2/1985 | Nakamura et al. | 123/90.17 |
| 4,535,731 | 8/1985 | Banfi | 123/90.17 |
| 4,762,097 | 8/1988 | Baker | 123/90.17 |
| 4,811,698 | 3/1989 | Akasaka et al. | 123/90.31 |

FOREIGN PATENT DOCUMENTS

| | | |
|---|---|---|
| 3126620 | 2/1982 | Fed. Rep. of Germany . |
| 3316162 | 11/1983 | Fed. Rep. of Germany . |
| 3326096 | 1/1985 | Fed. Rep. of Germany . |

Primary Examiner—Willis R. Wolfe
Assistant Examiner—Weilnn Lo
Attorney, Agent, or Firm—Barnes & Thornburg

[57] ABSTRACT

An angular adjustment is provided between a crankshaft and camshaft by a hydraulically operated rotary vane, which is pivotably mounted on the camshaft and is supported on a sprocket wheel carrier driven by a crankshaft rotation of the vane causing a relative rotation to take place between the crankshaft and camshaft. The rotary vane is held in each of its two end positions by a spring device.

20 Claims, 2 Drawing Sheets

APPARATUS FOR RELATIVE ANGULAR ADJUSTMENT BETWEEN TWO SHAFTS IN DRIVE CONNECTION

BACKGROUND AND SUMMARY OF THE INVENTION

The invention relates to an apparatus for providing relative angular adjustment between a crankshaft and at least one camshaft and wherein the camshaft is positively connected through a drive-end flange shaft to a cylindrical hollow shaft via an actuating element. The hollow shaft surrounds the actuating element and has a driving wheel connected to the drive shaft. The actuating element divides an annular space formed between the hollow shaft and flange shaft into two separate working spaces and is alternatingly supplied with oil pressure from the engine oil circuit and returned again to it, as a function of the position of a control element located in the flange shaft.

An apparatus for altering the phasing between a main shaft and a control shaft in engines which has two separate control shafts for inlet valves and outlet valves and which allows changing between two different control time settings is known from German Offenlegungsschrift 3,126,620. Each of two control time settings corresponds to an end position of a movable drive member which is connected via couplings, of which at least one is provided with a helical gearing, to a main shaft and a control shaft. Through axial displacement, a rotation of the control shaft relative to the main shaft is obtained. The adjustment of the drive member into one of two end positions is performed by the pretension of a spring. The adjustment into the other end position is caused by pressure oil from the engine oil circuit. A slide valve operated by centrifugal force assumes three different positions, depending on the engine speed. It accordingly opens and closes oil outflow bores and thus controls the oil pressure on the drive member. In a position of the slide valve which opens an oil outflow bore when the engine is below a certain engine speed, only a spring force, which holds the drive member in an end position, acts on the drive member.

If the engine speed exceeds this first threshold speed value, the slide valve closes the oil outflow bore on account of the change in centrifugal force and the drive member is displaced by the increasing engine oil pressure against spring tension, axially into a second end position. A relative turning thus occurs between the main shaft and control shaft and a control time setting adapted to this engine operating state is thus achieved as a result. After exceeding a further threshold value for the engine speed, the slide valve is moved into a position which again makes an oil outflow possible. Due to the spring force, the drive member is again returned into its first end position, with corresponding relative rotation. The adjustment of the drive member when the threshold values for the engine speed are not reached also takes place in the same way.

German Offenlegungsschrift 3,316,162 also shows a comparable apparatus, the only difference being that the operation of the drive member is not controlled by centrifugal forces, instead the slide valve controlling the oil flow is electromagnetically operable.

Both said apparatuses have the disadvantage that the control is performed by means of an influencing of the oil outflow. In one of the two working positions of the drive member there is a constant oil flow, with the associated losses.

A further disadvantage is that in a resetting operation into the initial position, the oil, forced out of the working space by the spring force from the drive member, has to be taken away through the same oil outflow bore through which the oil constantly flowing in this position of the slide valve is also passed. This fact results in an undesired slowing of the resetting operation.

At low engine speeds, for example in idling operation, the oil pressure is too low to be able to bring about an adjustment. For this reason, the drive member must be brought into the position corresponding to this operating state by spring force. At low speed and consequently also low oil pressure, such a spring force can prevent an adjustment of the drive member by pressure oil in the time periods in which there is an inhibiting camshaft torque, so that an adjustment can only take place when there is a driving camshaft torque, that is to say intermittently. In order to avoid the undesired resetting of the drive member caused by the spring force together with the camshaft torque, the helical gearing must be of a self-inhibiting design, that is with flat angle of skew. However, such an angle of skew also only allows for a short adjustment distance, i.e. the relative angular adjustment between main shaft and control shaft or camshaft is small, and thus so too is the influence of a control time alteration.

The object of the invention is to create an apparatus of the generic type, avoiding the disadvantages mentioned, which in a compact and with a simple construction that ensures a rapid and reliable angular adjustment.

The object is achieved in that the actuating element is designed as a rocker which is mounted pivotably on the flange shaft about a pivot axis running parallel to the camshaft axis and is in engagement with the hollow shaft. The rocker is able to assume two end positions in the annular space between the hollow shaft and flange shaft.

A further advantage is obtained by having a spring element, provided in a hollow space of the rocker surrounding the flange shaft, to hold the rocker under pretension in its respective end position. The spring element can consist of a spring clip embracing the flange shaft for over more than half the circumferential length of this shaft and the spring element also bears on at least two points on the inside on the rocker. The two end positions of the rocker are defined by two stop edges on the hollow shaft for limiting the pivoting movement of the rocker. The rocker can also be held in each end position at the respective stop by a resilient detent element thereat. The rocker engages with a nose in a gate fitted on the inside of the hollow shaft. The flange shaft has a transverse bore which connects the control element, arranged inside the flange shaft, to the hollow space of the rocker.

The sprocket wheel carrier is designed as hollow shaft. A sprocket wheel is located thereon and is driven by a crankshaft via a chain connection. The open side of the sprocket wheel carrier is closed by the camshaft, which is firmly connected to a hollow flange shaft running coaxially to the sprocket wheel carrier axis.

The sprocket wheel carrier, camshaft and flange shaft together form an annular hollow space, which is subdivided into two working spaces by an actuating element, which is designed as a rotary vane and is mounted pivotably between two end positions about an axis running parallel to the camshaft. In the hollow flange shaft there is arranged a control plunger, which has two working positions. The plunger is held by a spring in one of these working positions and can be moved axially against the spring force into the other working position by an armature of an electromagnet fixed in the engine, firmly connected to it. Depending on the armature position, the supply of pressure oil from the engine oil circuit is fed via an oil bore of the camshaft into one of the working spaces and the outflow of oil from the respective other working space is returned to the engine. The rotary vane is adjusted hydraulically in both directions and therefore does not require a separate spring force for the return. Thus, no spring force has to be overcome in the adjustment and consequently a greater actuating torque can be realized. The elimination of the spring thus also allows an adjustment in the low speed range, that is at only low engine oil pressure. In contrast to German Offenlegungsschrift 3,126,620, defining the generic type, there is also no constant oil flow. Instead oil flow occurs only during an adjusting operation until one of the two working positions has been reached.

In the basic position, the electromagnet is de-energized and the control plunger is held by the spring in the one end position. After switching on of the electromagnet, the control plunger is moved against the spring force into the other end position. Due to the resultant supplying of pressure oil into one of the two working spaces, the rotary vane is pivoted and rotates the flange shaft via a support connection of a nose fitted on a gate provided on the inside of the hollow shaft bearing of the driving wheel. This also rotates the camshaft relative to the sprocket wheel driven by the crankshaft. Due to the axial pivoting of the rotary vane, oil is pushed out from the respectively other working space and returned to the engine oil circuit. When the electromagnet is switched off, the control plunger returns with the aid of the spring force into its initial position. This causes a supply of pressure oil to the other working space and releases the oil outflow from the previously pressurized working space. By this renewed actuating operation, the previously performed relative rotation is reversed again.

Other objects, advantages and novel features of the present invention will become apparent from the following detailed description of the invention when considered in conjunction with the accompanying drawings.

DETAILED DESCRIPTION OF THE DRAWINGS

Figure 1:
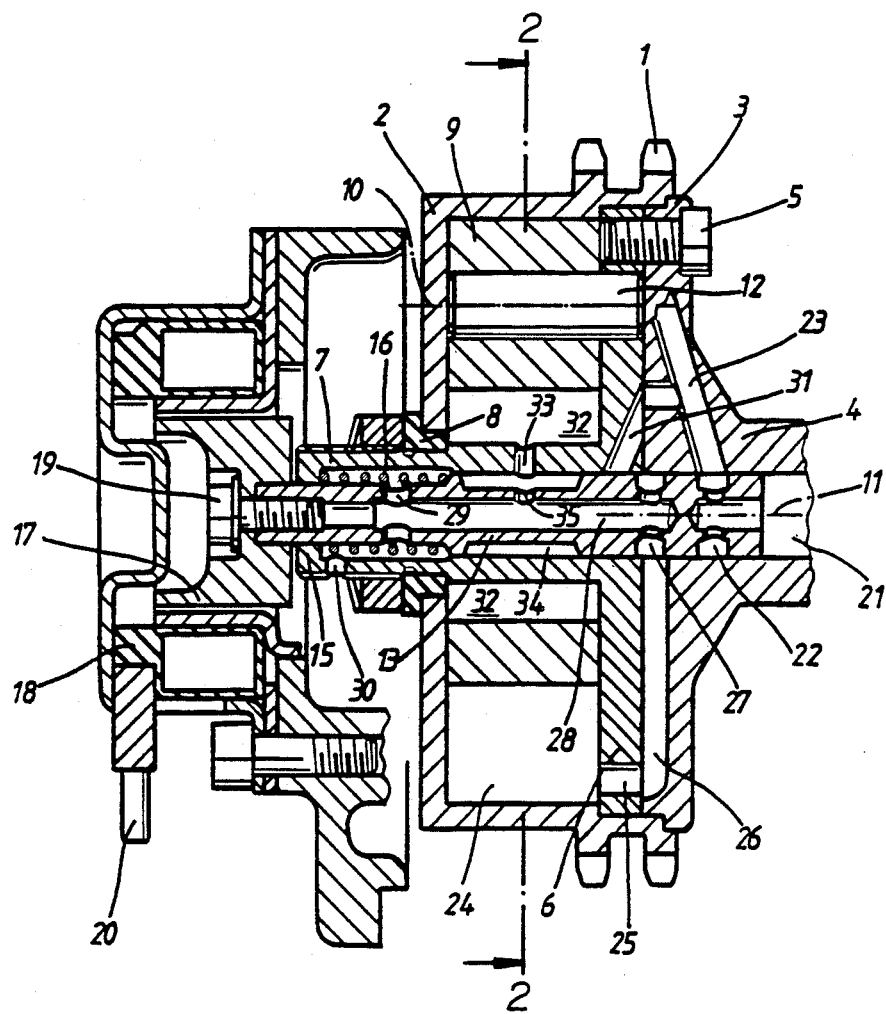
FIG. 1 shows an apparatus according to the invention in longitudinal section.

FIG. 1 shows an adjustment apparatus wherein a sprocket wheel 1, driven by a crankshaft (not shown) by means of a chain (not shown), is seated on a sprocket wheel carrier 2, designed as hollow shaft. This sprocket wheel carrier 2 is supported rotatably at one end 3 of a camshaft 4 and on an end plate 6 of a flange shaft 7, which plate is firmly connected to this camshaft 4 by means of a screw connection 5. The other side of the sprocket wheel carrier 2 is mounted rotatably on a cover 8 surrounding the flange shaft 7 and fixed to the engine housing. Sprocket wheel carrier 2, end plate 6, flange shaft 7 and cover 8 define an annular space for a rotary vane 9. The rotary vane 9 is pivotably fastened on a bolt 12, running with its axis 10 parallel to the axis 11 of the camshaft 4 and mounted in the end plate 6.

In the hollow flange shaft 7 there is arranged an axially displaceable control plunger 13, which is forced by a spring 16, supported at one end 15 to the flange shaft 7, into its basic position in a direction toward the camshaft 4. On the side away from the camshaft 4 an electromagnet 18 is connected to the engine, fixed to the control plunger 13 rotating with the adjustment apparatus through an armature 17. The armature in turn is connected to the control plunger 13 by a screw joint 19. The electromagnet 18 is designed as an annular magnet, in which the armature 17 is inserted freely rotatably. The electromagnet 18 is electrically connected to a control device (not shown) via a terminal 20.

When an electric voltage is supplied to the electromagnet 18 by the control device, the rotating armature 17 is caused to be moved by the field of the electromagnet in the direction to bring the control plunger 13, firmly connect to it, out of its basic position into a working position against the force of the spring 16. In this case, the axial adjustment distance is chosen such that the armature 17, in its working position, does not come into contact with a housing part of the electromagnet 18. In this way no friction occurs between the rotating armature 17 and the fixed housing and consequently no wear occurs either. The control plunger 13 remains in this working position as long as voltage is supplied to the electromagnet 18 and only when this voltage has been switched off, does the plunger 13 return into its basic position in the direction of the camshaft 4, by the force of the spring 16.

In the de-energized state of the electromagnet 18, the control plunger 13 is in its basic position shown and held there by the force of the spring 16. Lubricating oil passes under pressure from an engine oil circuit into a working space 37 via an oil longitudinal bore 21 in the camshaft 4, a transverse bore 22 in the control plunger 13 and a connecting bore 23 in the camshaft 4. At the same time, oil which is forced out of the second working space 24, on account of the pivoting of the rotary vane 9 resulting from the filling of the first working space, passes via oil bores 25 and 26 into a second transverse bore 27 of the control plunger 13 and from there through a longitudinal bore 28 and a further transverse bore 29 of the control plunger 13 and from there to transverse bore 30 in end plate 6 in a way not shown in more detail, back into the engine oil circuit.

When operated by the control device, the electromagnet 18 attracts the armature 17 and the control plunger 13 connected to the latter, against the force of the spring 16 to such an extent that the supply of pressure oil from the engine oil circuit via the oil longitudinal bore 21 of the camshaft 4 to the connecting bore 23 is blocked. Pressure oil then passes via the transverse bore 22 of the control plunger 13 and the oil bores 26 and 25 into the second working space 24, in which it brings about a pivoting movement out of the first operating space to pass oil via the oil bores 23, 31, 27, 28, 29 and 30 back into the engine oil circuit.

The leakage oil passing out of the working spaces into the pressureless hollow space 32 of the rotary vane 9, surrounding the flange shaft 7, is taken away via a venting bore 33 and bore 35 connecting the annular gap 34 of the control plunger 13 to the oil longitudinal bore 28.

Figure 2:
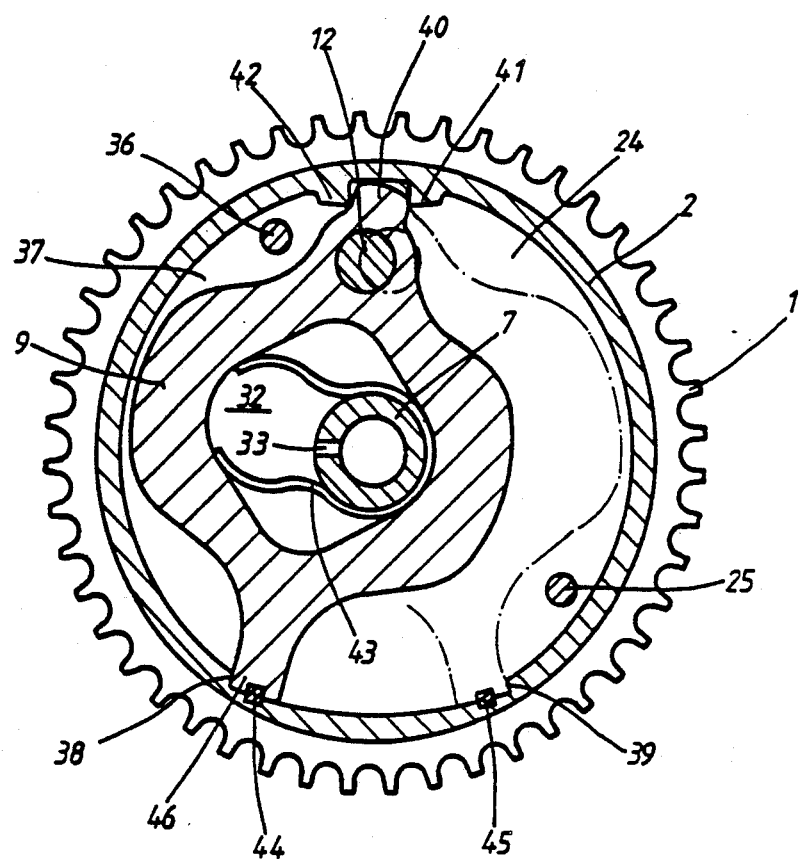
FIG. 2 shows a section through an apparatus according to the invention along line of intersection II—II in FIG. 1.

In the section shown in FIG. 2, along the line of intersection II—II in FIG. 1, the parts which are the same as in FIG. 1 bear the same reference numerals.

Again the sprocket wheel 1 is seated on the sprocket wheel carrier 2 and there is the flange shaft 7. For the sake of clarity, the control plunger 13 arranged in the flange shaft 7 is not shown. In the basic position of the control plunger, pressure oil passes via an orifice 36 of the connecting bore 23, not visible here, into the first working space 37. As a result, the rotary vane 9, which is mounted pivotably by means of the bolt 12 in the end plate of the flange shaft 7, is pushed out of its position at the stop edge 38 and brought into its position indicated by broken lines at the other stop edge 39. In this pivoting movement, the rotary vane 9 forces the oil out of the second working space 24, from where it is fed via the bore 25 and back to the engine oil circuit as explained previously. In its pivoting about the bolt 12, the rotary vane 9 is supported by a nose 40 fitted to it on a gate 41, 42, which is arranged on the inside of the sprocket wheel carrier 2. As a result, a relative rotation takes place between the sprocket wheel carrier 2, and the end plate of the flange 7 with the camshaft 4.

In the working position of the control plunger described above, pressure oil passes via the bore 25 into the second working space 24 and thus brings about a renewed pivoting of the rotary vane 9, as a result of which, the oil located in the working space 37 is fed via the orifice 36 to the engine oil circuit and a relative rotation takes place in the opposite direction.

Leakage oil from the two working spaces 24 and 37 collects in the hollow space 32 of the rotary vane 9 surrounding the flange shaft 7, from whence it is fed via a venting bore 33 in the known way described above to the engine oil circuit.

At low engine oil pressure, such as occurs for example during starting or in the idling phase, the rotary vane 9 may perform uncontrolled oscillating movements which cause rattling noises. This is the case in particular with engines having greatly changing camshaft torques. In order to avoid such a rattling, the invention provides a spring element, which holds the rotary vane 9 under pretension in its respective end position. This spring element is designed as a spring clip 43, which has an oval shape, open on one side and constricted in the middle. The spring clip 43 bears against the inside of the hollow space 32 of the rotary vane 9 which surrounds the flange shaft 7 in one end position of the rotary vane 9, and embraces the flange shaft 7. Due to the constriction of the spring clip 43, the rotary vane 9 is held in this end position and a rattling is prevented. Only if the oil pressure in the working space rises above a certain value can the tension of the spring clip 43 be overcome. Upon widening of the point of constriction of the spring clip 43, the rotary vane 9 moves through the flange shaft 7 into its other end position, in which it is held by the spring clip 43 - secured again against rattling.

A second possibility of securing the rotary vane 9 against rattling is to hold the rotary vane 9 in its two end positions at the stop edges 38 and 39 by resilient detent elements. Such a detent element may, for example, consist of known ball-spring elements 44, 45, only shown here diagrammatically, which act between the sprocket wheel carrier 2 and a nose 46 of the rotary vane 9.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Apparatus for obtaining a relative angular adjustment between a crankshaft and at least one camshaft wherein:

a camshaft is positively connected to an end plate of a flange shaft and via an actuating means to a cylindrical hollow shaft, which surrounds the actuating means and has a driving wheel connected to a crankshaft;

the actuating means divides an annular space located between the hollow shaft and the end plate and flange shaft into two separate working spaces;

said actuating means being alternatingly connected with pressure oil, supplied from an engine oil circuit and returned again to it, as a function of the position of a control element located in the flange shaft, said actuating means being designed as a rocker which is mounted pivotably on the flange shaft about a pivot axis running parallel to an axis of the camshaft and wherein said rocker is in driving engagement with the hollow shaft and is caused to alternatively assume one of two end positions in the annular space between hollow shaft and flange shaft.

2. Apparatus according to claim 1, wherein a spring means holds the rocker under pretension in either respective end position and is provided in a hollow space of the rocker surrounding the flange shaft.

3. Apparatus according to claim 2, wherein the spring means consists of a spring clip embracing the flange shaft over more than half a circumferential length of this flange shaft while also bearing on at least two points on the inside on the rocker.

4. Apparatus according to claim 1, wherein the two end positions of the rockers are defined by two stop edge means on the hollow shaft for limiting the pivoting movement of the rocker.

5. Apparatus according to claim 2, wherein the two end positions of the rockers are defined by two stop edge means on the hollow shaft for limiting the pivoting movement of the rocker.

6. Apparatus according to claim 3, wherein the two end positions of the rockers are defined by two stop edge means on the hollow shaft for limiting the pivoting movement of the rocker.

7. Apparatus according to claim 1, wherein the rocker is held in each end position at a respective stop edge by a resilient detent means.

8. Apparatus according to claim 2, wherein the rocker is held in each end position at a respective stop edge by a resilient detent means.

9. Apparatus according to claim 3, wherein the rocker is held in each end position at a respective stop edge by a resilient detent means.

10. Apparatus according to claim 4, wherein the rocker is held in each end position at a respective stop edge by a resilient detent means.

11. Apparatus according to claim 1, wherein the rocker engages with a nose in a gate fitted on an inside of the hollow shaft.

12. Apparatus according to claim 2, wherein the rocker engages with a nose in a gate fitted on an inside of the hollow shaft.

13. Apparatus according to claim 3, wherein the rocker engages with a nose in a gate fitted on an inside of the hollow shaft.

14. Apparatus according to claim 4, wherein the rocker engages with a nose in a gate fitted on an inside of the hollow shaft.

15. Apparatus according to claim 5, wherein the rocker engages with a nose in a gate fitted on an inside of the hollow shaft.

16. Apparatus according to claim 1, wherein the flange shaft has a transverse bore, which connects the control element, arranged inside the flange shaft, to the hollow space of the rocker.

17. Apparatus according to claim 2, wherein the flange shaft has a transverse bore, which connects the control element, arranged inside the flange shaft, to the hollow space of the rocker.

18. Apparatus according to claim 3, wherein the flange shaft has a transverse bore, which connects the control element, arranged inside the flange shaft, to the hollow space of the rocker.

19. Apparatus according to claim 4, wherein the flange shaft has a transverse bore, which connects the control element, arranged inside the flange shaft, to the hollow space of the rocker.

20. Apparatus according to claim 5, wherein the flange shaft has a transverse bore, which connects the control element, arranged inside the flange shaft, to the hollow space of the rocker.

* * * * *